US011258656B2

(12) United States Patent
Suryanarayanarao et al.

(10) Patent No.: US 11,258,656 B2
(45) Date of Patent: Feb. 22, 2022

(54) OPTIMIZING MANAGEMENT ENTITY SELECTION RESILIENCY FOR GEO-REDUNDANCY AND LOAD BALANCING IN MOBILE CORE NETWORK

(71) Applicant: Cisco Technology, Inc., San José, CA (US)

(72) Inventors: Raghavendra Suryanarayanarao, Bangalore South (IN); Om Prakash Suthar, Bolingbrook, IL (US); Aeneas Sean Dodd-Noble, Andover, MA (US); Vivek Agarwal, Chelmsford, MA (US); Rajiv Asati, Morrisville, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 89 days.

(21) Appl. No.: 16/278,787

(22) Filed: Feb. 19, 2019

(65) Prior Publication Data

US 2020/0267049 A1 Aug. 20, 2020

(51) Int. Cl.
*H04L 12/24* (2006.01)
*H04W 76/10* (2018.01)
(Continued)

(52) U.S. Cl.
CPC ...... *H04L 41/0668* (2013.01); *H04L 41/0893* (2013.01); *H04L 47/125* (2013.01);
(Continued)

(58) Field of Classification Search
CPC ............... H04L 41/0668; H04L 47/125; H04L 41/0893; H04L 45/304; H04L 41/044;
(Continued)

(56) References Cited

U.S. PATENT DOCUMENTS 8,311,541 B2 * 11/2012 Yano ................. H04W 52/0203
455/436
8,948,014 B2 2/2015 Velamati et al.
(Continued)

FOREIGN PATENT DOCUMENTS

EP 3001728 A1 3/2016
WO 2014201692 A1 12/2014
WO 2016160018 A1 10/2016

OTHER PUBLICATIONS

International Search Report and Written Opinion in counterpart International Application No. PCT/US2020/017867, dated May 4, 2020, 17 pages.
(Continued)

*Primary Examiner* — Christopher P Grey
(74) *Attorney, Agent, or Firm* — Edell, Shapiro & Finnan, LLC

(57) ABSTRACT

Techniques are presented in which a new information element signaling priority of a management entity is included in a setup (e.g., S1-Setup) response or configuration update message sent by a management entity to a base station entity. The base station entity interprets this priority information along with the relative capacity information in an appropriate way to load-distribute the traffic/calls to highly preferable management entity instances (at a local site) when they are available, and switchover/failover to lower preference management entity instances (at a remote site) when there is a local site outage/failure or insufficient capacity in a geo-resilient pooled network.

21 Claims, 9 Drawing Sheets

(51) Int. Cl.
  H04L 12/803    (2013.01)
  H04W 72/10     (2009.01)
  H04W 88/08     (2009.01)
  H04W 88/16     (2009.01)
  H04L 41/0668   (2022.01)
  H04L 47/125    (2022.01)
  H04L 41/0893   (2022.01)

(52) U.S. Cl.
  CPC .......... H04W 72/10 (2013.01); H04W 76/10 (2018.02); *H04W 88/08* (2013.01); *H04W 88/16* (2013.01)

(58) Field of Classification Search
  CPC .. H04L 41/0695; H04W 72/10; H04W 76/10; H04W 88/16; H04W 88/08; H04W 40/24; H04W 24/04; H04W 48/18
  See application file for complete search history.

(56) References Cited

U.S. PATENT DOCUMENTS

| | | | | |
|---|---|---|---|---|
| 9,608,860 | B1* | 3/2017 | Qian ..................... | H04W 24/04 |
| 10,327,129 | B2* | 6/2019 | Ianev ................... | H04W 76/27 |
| 10,327,207 | B2* | 6/2019 | Jain .......................... | H04J 3/00 |
| 2010/0080186 | A1* | 4/2010 | Guo ...................... | H04W 28/08 |
| | | | | 370/329 |
| 2011/0235505 | A1 | 9/2011 | Eswara et al. | |
| 2012/0069737 | A1* | 3/2012 | Vikberg ................ | H04W 28/12 |
| | | | | 370/232 |
| 2016/0295449 | A1* | 10/2016 | Seenappa .............. | H04L 47/283 |
| 2017/0164135 | A1* | 6/2017 | Kodaypak ............... | H04W 4/70 |

OTHER PUBLICATIONS

Motorola, "Remaining Open Issues in Load Balancing", 3GPP TSG RAN3 #61, R3-082188, Aug. 18-22, 2008, 3 pages.
Saurabh Gupta et al., "Load Balance MME in Pool", Document ID: 119021, Jun. 19, 2015, 9 pages.
Alcatel-Lucent, "EUTRAN Cell and Interface Management", Feb. 10, 2011, 99 pages.
Alcatel-Lucent, "The LTE Network Architecture; A comprehensive tutorial", Strategic White Paper, downloaded Dec. 2, 2009, 26 pages.
Keisuke Suzuki et al., "Technology Supporting Core Network (EPC) Accommodating LTE", NTT DOCOMO Technical Journal vol. 13 No 1, Dec. 12, 2011, 6 pages.
3GPP, "3rd Generation Partnership Project; Technical Specification Group Radio Access Network; NG-RAN; NG Application Protocol (NGAP) (Release 15)", 3GPP TS 38.413 V15.2.0, Dec. 2018, 308 pages.
3GPP, "3rd Generation Partnership Project; Technical Specification Group Services and System Aspects; System Architecture for the 5G System; Stage 2 (Release 15)", 3GPP TS 23.501 V15.4.0, Dec. 2018, 236 pages.
3GPP,3rd Generation Partnership Project; Technical Specification Group Services and System Aspects; Procedures for the 5G System; Stage 2 (Release 15), 3GPP TS 23.502 V15.4 1, Jan. 2019, 379 pages.
3GPP,3rd Generation Partnership Project; Technical Specification Group Radio Access Network; Evolved Universal Terrestrial Radio Access Network (E-UTRAN); S1 Application Protocol (S1AP) (Release 15), 3GPP TS 36.413 V15.4.0, Dec. 2018, 383 pages.
3GPP, "3rd Generation Partnership Project; Technical Specification Group Radio Access Network; Evolved Universal Terrestrial Radio Access Network (E-UTRAN); S1 general aspects and principles (Release 15)", 3GPP TS 36.410 V15.0.0, Jun. 2018, 15 pages.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.1.0, Dec. 2018, 411 pages.
3Gpp, "3rd Generation Partnership Project; Technical Specification Group Radio Access Network; Evolved Universal Terrestrial Radio Access Network (E-UTRAN); S1 Application Protocol (S1AP) (Release 14)", 3GPP TS 36.413 V14.0.0, Sep. 2016, 333 pages.

* cited by examiner

OPTIMIZING MANAGEMENT ENTITY SELECTION RESILIENCY FOR GEO-REDUNDANCY AND LOAD BALANCING IN MOBILE CORE NETWORK

TECHNICAL FIELD

The present disclosure relates to mobile wireless core network architectures.

BACKGROUND

In a wireless mobile core network, an S1-Flex mechanism is used to provide for network redundancy and load sharing of traffic across network elements in the core network. A Mobility Management Entity (MME) and the Serving Gateway (SGW) create a pool of MMEs and SGWs, allowing each base station (also called eNodeB—eNB) to be connected to multiple MMEs and SGWs in a pool. The S1-Flex architecture ensures functionality and flexibility with no single point of failure.

DESCRIPTION OF EXAMPLE EMBODIMENTS

Overview

Figure 1:
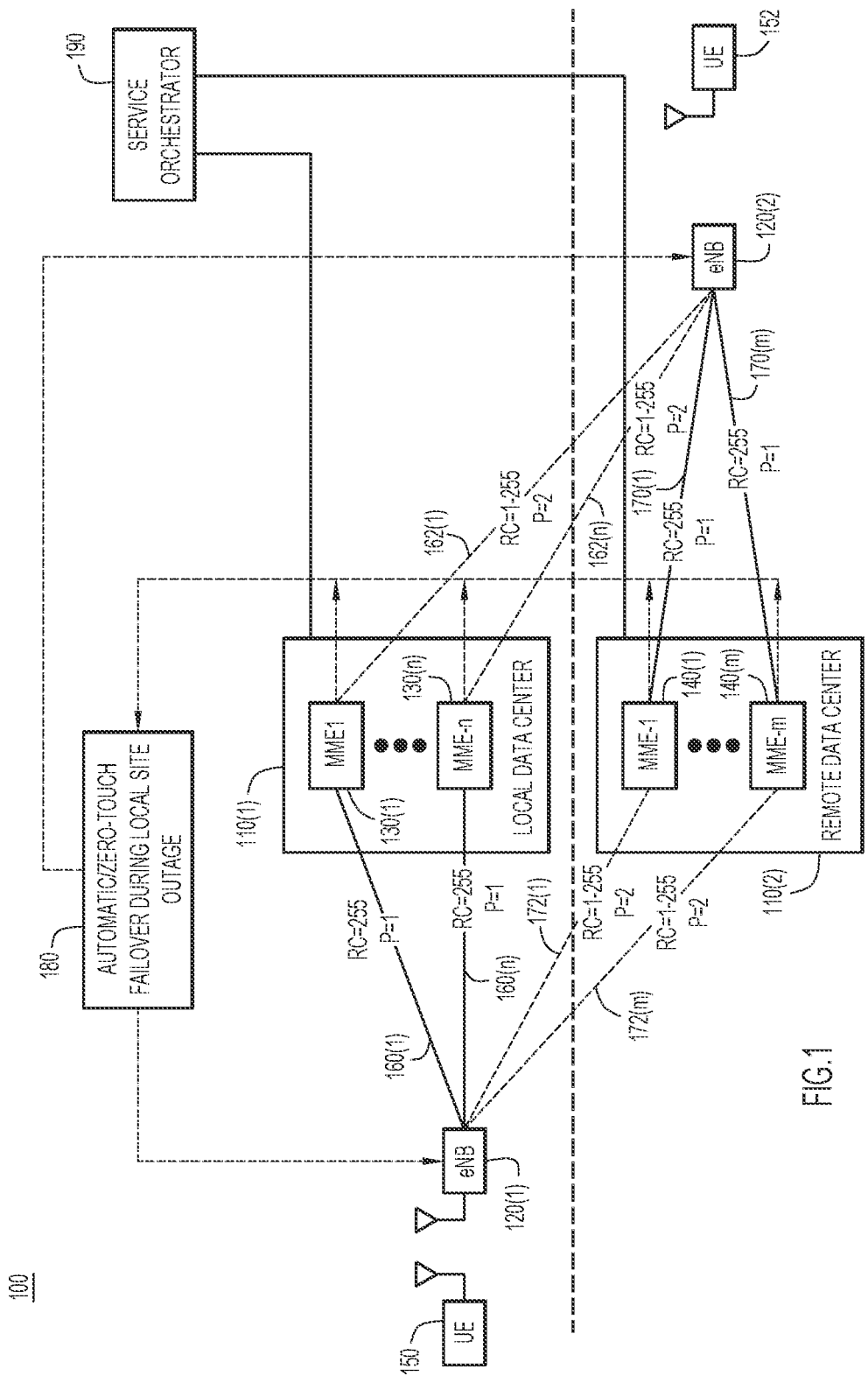
FIG. 1 is a diagram of a mobile core network configured to provide automatic failover/switchover between a base station entity and primary/local as well as backup/remote sites of management entities, according to an example embodiment.

Techniques are presented in which a new information element, that signals priority of a management entity, is included in a setup (e.g., S1-Setup) response or configuration update message sent by a management entity to a base station entity. The base station entity interprets this priority information along with the existing relative capacity information in an appropriate way to load-distribute the traffic/calls to highly preferable management entity instances (at a local site) when they are available, and switchover/failover to lower preference management entity instances (at a remote site) when there is a local site outage/failure or insufficient capacity in a geo-resilient pooled network.

Thus, in one embodiment, a method is provided that is performed by a management entity in a mobile core network. The method involves obtaining priority information that indicates a priority assigned to the management entity, the priority to be used by a base station entity for selection of the management entity among a plurality of management entities to manage connections of the base station entity, the priority being dependent on which of a plurality of groups of base station entities for which the management entity may be selected; determining to provide to a particular base station entity the priority information for the management entity; and providing to the particular base station entity the priority information for the management entity according to which of the plurality of groups of base station entities the particular base station entity is a part.

In another embodiment, a method is provided that is performed by a radio network management entity for a mobile core network that includes a plurality of sites at which one or more management entities are provided to manage connections of user equipment served by a base station entity. The method includes defining a plurality of base station entity groups each of which includes one or more base station entities; and assigning to a management entity of the one or more management entities, a priority to be used for selection by a base station entity in a particular base station entity group of the plurality of base station entity groups, the priority depending on whether the management entity is part of a primary management entity pool for the particular base station entity group or is part of a backup management entity pool for the particular base station entity group.

In still another embodiment, a method is provided that is performed by a base station entity in a wireless network. The method includes obtaining from each of a plurality of management entities a message including a priority that indicates a selection priority the base station entity is to use when selecting among the plurality of management entities to manage connections of user equipment served by the base station entity, wherein a higher priority indicates to the base station entity that it is to select a management entity among the plurality of management entities for primary usage over management entities that have a lower priority, which the base station entity is to select for backup usage; and selecting a first management entity of the plurality of management entities based on the priority for each of the plurality of management entities.

EXAMPLE EMBODIMENTS

Mobility management in a mobile core network ensures that data sessions can be maintained as User Equipment (UE) devices move about the network. In the fourth generation (4G)/Long Term Evolution (LTE) architecture, the mobility management functions are centralized within a function/entity called the Mobility Management Entity (MME).

In the fifth generation (5G) architecture, the MME functionality is redistributed into precise families of mobility and session management network functions. As such, registration, reachability, mobility management and connection management are all new services offered by a new general network function referred to as the Access and Mobility Management Function (AMF). Session establishment and session management, also formerly part of the MME, are services provided by a network function called the Session Management Function (SMF). Furthermore, packet routing and forwarding functions, currently performed by the Serving Gateway (SGW) and Packet Data Network Gateway (PGW) in the 4G architecture, are realized as services rendered through a network function called the User Plane Function (UPF) which can be distributed at the network edge based on the type of applications.

When a single pool S1-flex solution is deployed across a geographically distributed data center, traffic distribution occurs based on the relative capacity of the MME learned by the eNBs via S1-Application Protocol (S1-AP) messages. In such a design, there is no mechanism to distribute traffic from their geographically concentrated eNBs to their nearest/local datacenter-based MME instances and also fulfill datacenter resiliency requirements.

As used herein, the term "management entity" is meant to include an MME as used in the 4G/LTE network architecture, an AMF in the 5G network architecture and any entity performing similar functions (such as management of wireless connection including setup/release procedures, handover signaling procedures due to mobility of UEs between base stations, paging procedures, etc.) in any future standard or technology hereinafter developed or defined.

Similarly, the term "base station entity" is meant to include an eNB as used in the 4G/LTE network architecture, a next generation Radio Access Network (NG-RAN) entity as used in the 5G network architecture and any entity performing similar functions (wirelessly communicating with UEs) in any future standard or technology hereinafter developed or defined.

There are situations in which there are multiple management entities in pools in a mobile core network. It is generally desirable to have traffic from base station entities to be directed to a local management entity datacenter, but when management entities in that datacenter can no longer serve new connections (due to capacity overload, failure or loss of connectivity), then the traffic may need to be sent to a remote management entity datacenter.

Presented herein are techniques for introducing a new information element (IE) in the messages sent by the management entities to the base station entities. This new IE includes priority configuration information to enable a priority-based selection by the base station entity of a management entity. Management entities in the local datacenter are configured to send a higher priority IE than MMEs in a remote datacenter. As explained herein, the priority may take the form of a numerical value (e.g., an integer) such that a lower numerical value indicates a higher priority, for example. The use of numerical priority values allows for quantifying a priority difference or delta between two or more management entities. A management entity that is configured to advertise a higher priority (e.g., lower numerical value) will be the active management entity for a particular base station entity (or group of base station entities) and a management entity that has a lower priority (e.g., higher numerical value) will serve as a backup management entity to the particular base station entity or group of base station entities.

During normal/steady state conditions, a base station entity sends traffic to the management entity with the higher priority. Only when the higher priority management entity can no longer serve new connections does the base station entity send traffic to the lower priority management entity. In so doing, zero-touch failover is achieved. No manual intervention is required. The base station entity detects when the higher priority active management entity cannot serve new connections, and automatically switches to the management entity with the lower priority that was its backup. Without this priority IE, the base station entity may direct traffic to a remote datacenter management entity based on relative capacity information even if a local datacenter management entity is available, which is less desirable.

As will become apparent from the following description, there can multiple remote management entity datacenters. The priority may be "P1" (highest priority) for management entities in the local datacenter, "P2" (first lower priority) for the first remote management entity datacenter, "P3" (second lower priority) for the second remote management entity datacenter, and so on, with successively lower priority.

Reference is made to FIG. 1. FIG. 1 shows a mobile core network 100 according to an example embodiment. The network architecture of the mobile core network 100 shown in FIG. 1 uses, by way of example only, concepts of the 4G/LTE architecture, but this is not meant to be limiting and it should be appreciated that these concepts are readily applicable to the 5G or any other network architecture. The network 100 includes a first datacenter 110(1) called a local data center and a second datacenter 110(2) called a remote datacenter. There is at least one eNB 120(1) that is associated with, and geographically local or proximate to the first datacenter 110(1) and at least one eNB 120(2) that is associated with, and geographically local to second datacenter 110(2). Thus, the first datacenter 110(1) is referred to as a local datacenter with respect to eNB 120(1) and the second datacenter 110(2) is referred to as a remote datacenter with respect to eNB 120(1).

The first datacenter 110(1) includes a pool of MMEs 130(1)-130(n) and the second datacenter 110(1) includes a pool of MMEs 140(1)-140(m), where m may or may not be equal to n. FIG. 1 shows a UE 150 attempting to attach to the network 100 at eNB 120(1) and a UE 152 attempting to attach to the network 100 at eNB 120(2).

The 4G/LTE standard has defined an interface, called the "S1 interface," that includes an interface between an MME and eNB, called the S1-MME interface. The S1-MME interface is responsible for delivering signaling between the eNB and the MME, and includes a Stream Control Transmission Protocol (SCTP) over Internet Protocol (IP) that supports multiple UEs through a single SCTP association. The S1-MME interface is responsible for Evolved Packet System (EPS) bearer setup/release procedures, handover signaling procedures (for UEs roaming from one eNB to another eNB), a paging procedure and the Non-Access Stratum (NAS) transport procedure.

The MME selection function on the S1 interface resides with the eNBs. The network 100 supports multiple eNBs connected to multiple MMEs. Thus, the eNB 120(1) has connectivity to all the MMEs 130(1)-130(n) in the first datacenter 110(1) as well as to all the MMEs 140(1)-140(M) in the second datacenter 110(2). Likewise, eNB 120(2) has connectivity to all the MMEs 130(1)-130(n) in the first datacenter 110(1) as well as to all the MMEs 140(1) 140(M) in the second datacenter 110(2).

When a UE, for example UE 150 or UE 152, is attempting to attach to the network 100, the UE sends a Radio Resource Control (RRC) connectivity request message. The UE may include in that request an System Architecture Evolved (SAE)-Temporary Mobile Subscriber Identity (S-TMSI) (a shortened form of the Globally Unique Temporary Identifier (GUTI) to enable more efficient radio signaling procedures) in order to facilitate the MME selection. The S-TMSI is a concatenation of the MME code (MMEC) and MME Temporary Mobile Subscriber Identity (M-TMSI).

Taking eNB 120(1) as an example, when eNB 120(1) connects to an MME, the eNB 120(1) initiates an SCTP connection towards the MME. The procedure for S1-Setup exchanges configuration data used by the MME and the eNB, respectively, to ensure a proper interoperation. The S1-Setup procedure is triggered by the eNB 120(1) towards all the MME instances in the pool, such as MMES 130(1)-130(n) in first datacenter 110(1) and this is the first S1-AP message exchange. In the S1-Setup response message, each MME returns the served Globally Unique MME Identifier (GUMMEI) Information Element (IE) and also the configured Relative Capacity (RC) IE.

As per the current 4G/LTE standard, an eNB can be connected to all the MMES in the pool (this is what is referred to as "S1-Flex" connection) and distribute sessions across the MMES in the pool, enhancing the resiliency of the network, but without any preference or higher priority set to MMES within the local datacenter in a geo-resilient datacenter ecosystem. In the current standards, the MME advertises only a weight factor to eNBs using the RC IE based on which eNBs can distribute the sessions across all the MMES in the pool relative to this value to share the load accordingly.

Most mobile operators use one of two designs for S1-Flex pooling when there are multiple geographically distributed datacenters. In a first design, the S1-Flex pools are segregated into multiple pools based on the eNB geographical concentration. When one datacenter fails, manual intervention is required to move the S1 links for the eNBs as needed to avoid the failed datacenter. Most mobile operators have eNBs deployed in the hundreds of thousands and in such scenario, migrating the traffic is time consuming and can cause service interruption.

In a second design, many mobile operators have a single S1-Flex pool across distributed geographical areas. With this design, all the MMES are advertising equal relative MME capacity to all eNBs in a S1-Flex network pool, so the amount of cross-site traffic from eNBs to a remote datacenter increases, even under "sunny day" conditions.

Accordingly, to overcome the aforementioned flaws of the existing S1-Flex pool designs, techniques are presented herein to provide an equal (in case of uniform/equal load-distribution need) non-zero relative-capacity advertisement by the MME instances in all the datacenters to the eNBs. Furthermore, a new S1-AP parameter/IE called "MME Priority" is also advertised by MMES in the pool during the S1-Setup procedure with eNBs. This MME Priority IE may be included along with the existing MME Relative Capacity IE in an S1-Setup response and in MME configuration update messages sent by the MMES towards eNBs. According to this solution, eNBs will look at the MME Priority as advertised by MME instances in the pool. Geo-redundancy S1-Flex/pooling is configured such that the local site MME instances advertise themselves with a higher MME Priority and these would be preferred over the remote site MME instances. If the higher priority MME instances are not accessible (due to overload, complete local site outage/disaster or S1-link isolation at the local site), then the eNBs automatically detect this condition and route (new) S1 traffic/calls to the remote site MME instances. One way to detect complete local site outage is by the SCTP heartbeat mechanism between eNBs and individual MME instances.

Thus, as shown at 160(1)-160(n) in FIG. 1, MMES 130(1)-130(n) in the first datacenter 110(1) advertise to the eNB 120(1) a MME Priority (P) of "1" (lower the value, the higher the priority/preference) and at 162(1)-162(n) a MME Priority of "2" to eNB 120(2). Conversely, at 170(1)-170(m) MMES 140(1)-140(m) in the second datacenter 110(2) advertise to the eNB 120(2) at 172(1)-172(m) an MME Priority of "1" and a MME Priority of "2" to eNB 120(1).

This approach is much more optimal and adept at achieving geo-resiliency as it ensures a graceful switchover of calls by eNBs to other (remote) site MME instances with very minimal downtime during local site outage/failure situation. Moreover, this is achieved in an automated or "zero-touch" fashion (i.e., no manual or service-orchestrator involvement) as shown at 180 in FIG. 1.

There is a service orchestrator entity 190 that is configured to communicate with the MMES of the datacenters 110(1) and 110(2). The service orchestrator entity 190 may provide priority information to be advertised by the MMES in the datacenters 110(1) and 110(2) to the appropriate eNBs. The service orchestrator entity 190 may be located in the cloud, but in network communication with the datacenters 110(1) and 110(2). As will become apparent from the description of FIG. 3, the service orchestrator entity may 190 may receive the priority information from another entity that manages radio access network entities in the network 100.

With the introduction of the "MME Priority" (through a configuration option on the MMES) in the S1-Setup response message sent by MMES to all the eNBs in the network pool, a more viable and intelligent decision criteria is enabled at the eNBs using both the "MME Relative Capacity" and "MME Priority" parameters. eNBs select the higher priority (local-site) MMES and load-distribute the traffic to the local-site MMES based on the Relative Capacity when the local-site MME instances are accessible. If the MME instances of the local-site are not accessible due to some site/datacenter disastrous condition or are others at full capacity, then switchover/failover to the lower priority (remote-site) MME instances automatically occurs. The switchover by the eNB occurs in a graceful and automated way with this solution. Again, without this solution, there is a need for manual intervention to divert this traffic from eNBs to the remote-site MME instances.

As explained, the changes to the S1-Setup procedures to enable this functionality involve introducing the additional attribute/IE "MME Priority" in S1-Setup response or MME configuration update message sent towards eNBs by MME instances in the S1-Flex network pool. The below example is for a 5G network architecture, but a similar configuration is applicable for a 4G/LTE network architecture. In a 5G network architecture, the AMF performs the advertising of the Priority to the Next Generation-Radio Access Network (NG-RAN) node, the 5G analog of a 4G/LTE eNB.

This message is sent by the AMF to transfer application layer information for an NG-C interface instance.

| Direction: AMF to NG-RAN node | |
| --- | --- |
| IE/Group Name | IE type and reference |
| ... | |
| Message Type | Indicated the type of message |
| AMF Name | AMF Name |
| Relative AMF Capacity | Relative Capacity of AMF |
| Relative AMF Priority | Relative Priority of the AMF |
| ... | |

The base station entity (eNB or NG-RAN) interprets this new IE and routes the calls appropriately. The base station entity locally configures these priorities against individual management entity instances within the pool (as per geo-resiliency pooling) and uses it appropriately when this IE is not received by some management entity in the pool. The base station entity overrides the locally configured priority when this IE is received from a management entity during setup or configuration update procedures.

Figure 2:
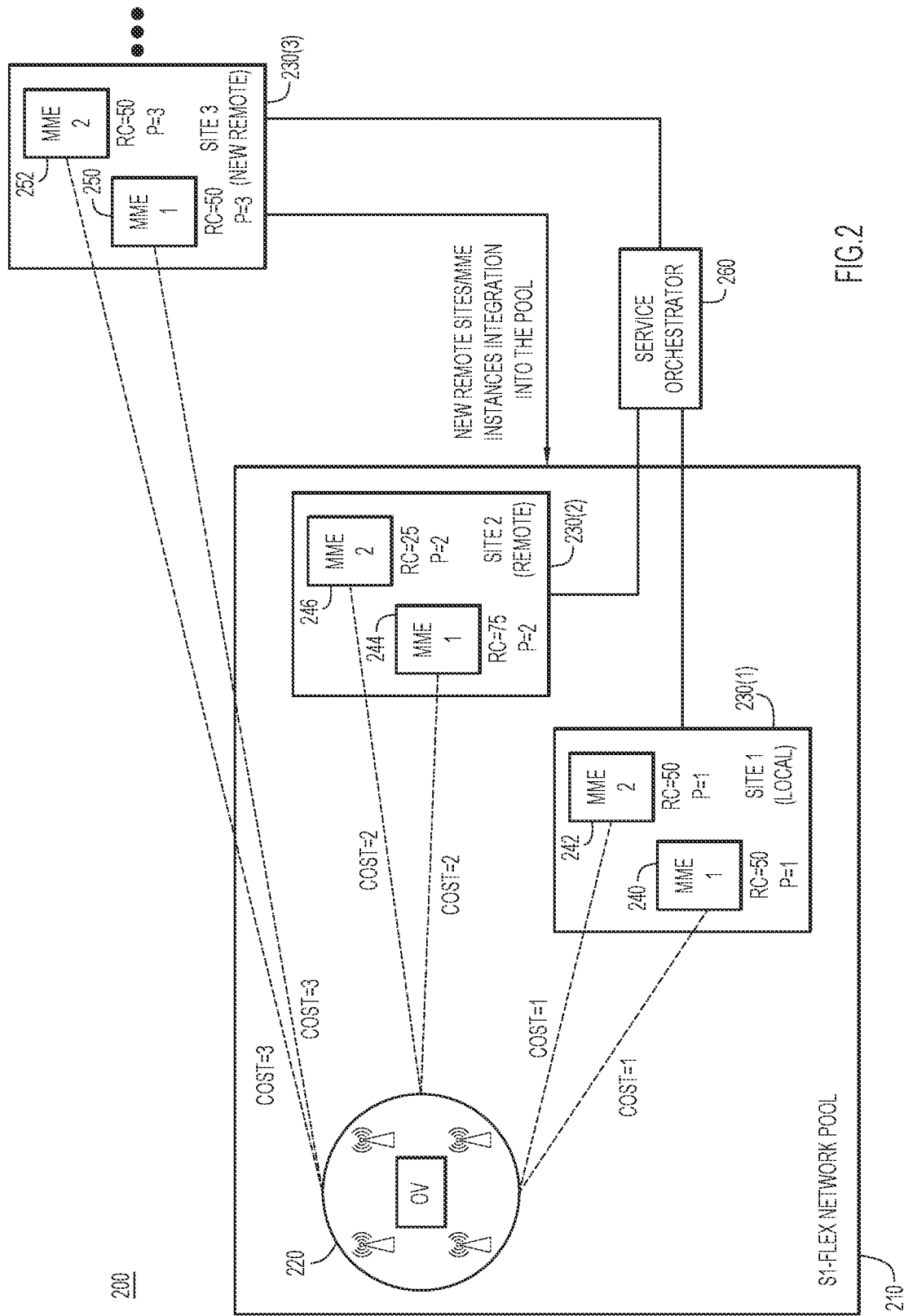
FIG. 2 is a diagram of a mobile core network, similar to FIG. 1, in which there are multiple backup/remote sites of management entities, according to an example embodiment.

Reference is now made to FIG. 2. FIG. 2 shows an extension of the concepts presented in FIG. 1, where instead of only two datacenter sites, there are three (or more) datacenter sites. More specifically, a network architecture 200 shown in FIG. 2 includes an S1-Flex network pool 210. The S1-Flex network pool 210 includes a base station entity group 220, a first (local) datacenter site 230(1) that includes a pool of MMEs 240 and 242, a second (remote) datacenter site 230(2) that includes MMEs 244 and 246. The example of FIG. 2 shows only two MMEs in datacenter sites 230(1) and 230(2) for simplicity. It should be understood that in an actual deployment there may be numerous more MMEs in each datacenter.

Since the datacenter site 230(1) is local to the base station entity group 220, the MMEs in datacenter site 230(1) advertise an MME Priority of "1" to the base station entity group 220. This is also shown as "Cost=1" for MMEs 240 and 242 of datacenter site 230(1). The datacenter site 230(2) is remote with respect to the base station entity group 220 so MMEs 244 and 246 advertise a MME Priority or Cost of "2". FIG. 2 also shows the Relatively Capacity (RC) that each of the MMEs 240, 242, 244 and 246 advertises to the base station entity group 220.

If a new datacenter site that includes MME instances needs to be integrated into the same S1-Flex pool, such as network pool 210, then a service orchestrator or an operator can configure an appropriate Priority that is advertised to an eNB during the S1-Setup procedure. Thus, the geo-resiliency can be maintained between two datacenter sites or groups (active/primary and standby/secondary), as well as to any number of datacenter sites with various priorities. This would allow a mobile network operator to configure a fully geo-resilient network ecosystem with efficient zero-touch failover handling.

To this end, FIG. 2 further shows that a new remote datacenter site 230(3), of MMEs 250 and 252, is to be integrated into the network pool 210. The MMEs 250 and 252 advertise a Priority or Cost of "3" to the base station entity group 220. A service orchestrator entity 260 in communication with the datacenter sites 230(1), 230(2) and 230(3) may be involved configuring the Priority that the MMEs from all datacenter sites 230(1), 230(2) and new remote datacenter site 230(3) advertise to the base station entity group 220, similar to that shown in FIG. 1.

The MME instances in a pool located in a datacenter site (e.g., datacenter site 230(1) in FIG. 2) may be assigned a higher Priority per base station entity group as compared to MME instances of other pools located in the same datacenter site or different datacenter sites. This means that MME instances at a datacenter site can have the same or different Priority, per base station entity group, depending on the deployment resiliency preference.

As depicted by the base station entity group 220 in FIG. 2, one or more base station entities can be grouped together based on one or more identifiers such as IP address prefix ranges, eNB-identifier (ID) ranges, Tracking Area Code (TAC) ranges, geographic ranges, etc. The group identifier can be used by an MME to map an eNB to the appropriate group during the S1-Setup procedure. Also, if an MME maintains the mapping between eNB and TAC, then the TAC could also be used because the MME provides the list of TACs to an eNB.

Generally, all MME instances associated with a base station entity group will have the same priority if they are to be selected based on Relative Capacity. Priority can be formulated based on one or more factors such as bandwidth, latency, distance, load, etc. Priority could be an operator configurable option per base station entity group per MME pool. The priority per base station entity group could be configured on the MMEs, or on Domain Name System (DNS) servers. If configured on the DNS servers, then the MME would retrieve the priority by DNS lookup during S1-Setup procedures by passing along an eNB identifier.

MME Selection

When an eNB selects an MME node for traffic distribution, the eNB first checks the Priority (lower the value, the higher the priority) and then checks the Relative Capacity values received during the S1-Setup procedure. This means that one or more MME instances of a pool would get utilized based on its Relative Capacity only after they are selected based on its Priority.

If the preferred pool's MME instances are determined to have reached their peak Relative Capacity (peak capacity), then the eNB could select the next preferred pool of MME instances, if available. The eNB may determine that the MME has reach its capacity when the MME sends an Overload Start indication as described in clause 8.7.6, "Overload Start" of 3GPP Technical Specification (TS) 36.413 and clause 4.3.7.4, "MME control of overload" from 3GPP TS 23.401. In a further variation, the eNB may start using an MME in the pool with the next highest Priority based on a threshold number of MMEs in the first preferred pool reporting an Overload Start.

In order to provide hysteresis and prevent oscillations among MME instances that may fail and restore, MME instances with a higher priority are to be selected for subsequent new connections once they are restored and become reachable from eNBs. Availability of a higher priority MME in the same pool should not impact existing sessions. If a new MME pool becomes available with the same Priority as that of an existing MME pool, then eNBs could select them all according to their Relative Capacity values. If an MME is added to a pool with the same Priority as that of MMEs currently being selected, the eNB may select that new MME based on its Relative Capacity.

Furthermore, in order to provide hysteresis and prevent oscillations between MME selections, an eNB may be configured to look for a specific difference in priority of an MME and a priority of a new MME to which a switch could be made. For example, a situation may arise when a higher priority (lower numerical value) MME becomes available. The eNB would evaluate the priority for that MME and only switch to send new sessions to that MME if the difference between the priority of the currently used MME and the other (new) MME is greater than a predetermined threshold (e.g. such as "5" or "10"). This changes the state behavior of the eNB's determination for S1-AP path selection and not the signaling to it from the MMES.

During a failure scenario, when all the preferred MME instances in a pool (i.e. those that advertised with a better/higher priority) become inaccessible, the eNB would consider the next priority MME instances and the sessions from the eNB would get re-distributed automatically based on the relative MME capacities as advertised by MMES of that pool. In the example depicted in FIG. 2, MMES 244 and 246 at datacenter site 230(2) will be considered as the next priority set when MMES at datacenter site 230(1) (the local datacenter) become inaccessible.

When an MME datacenter site recovers from a failure, a new set of MMES is added to the pool, or a Priority of an MME is changed and conveys its (higher) priority per eNB group using the S1-Setup procedure, an eNB can start distributing all new sessions to a higher priority MME and not impact (preempt) the existing sessions, even if the existing sessions were attached to lower priority MMES.

It is possible that a "tie" situation may occur where two or more MMES have the same priority value. In this situation, the base station may perform a tie-breaking evaluation by selecting one of the MMES with the same priority, based on their utilization (i.e., Relative Capacities), distance from the base station, etc.

Figure 3A:
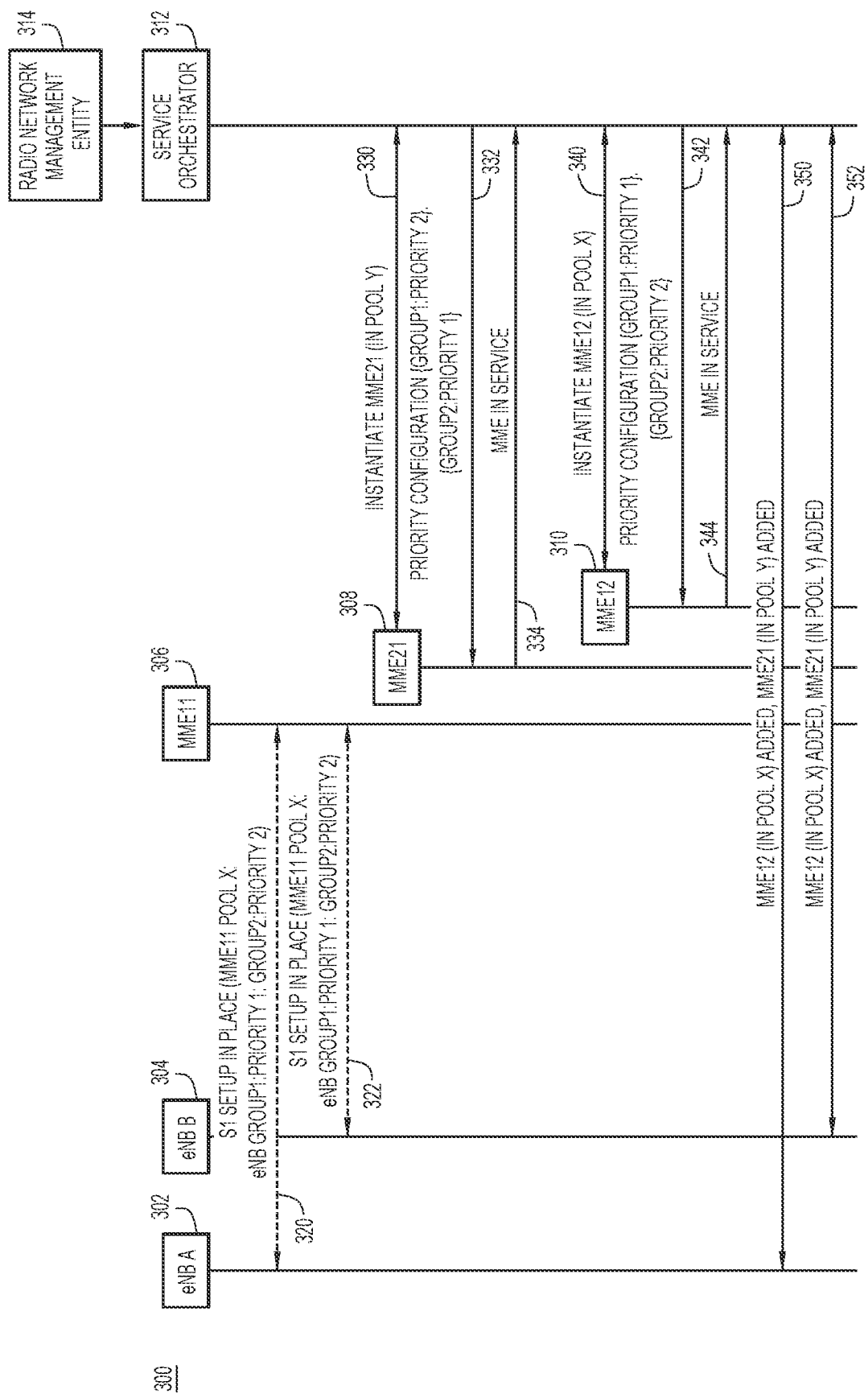
FIGS. 3A and 3B illustrate a sequence diagram of message signaling between base station entities, management entities and a service orchestrator entity to configure the mobile core network for the automatic failover/switchover depicted in FIGS. 1 and 2.
Figure 3B:
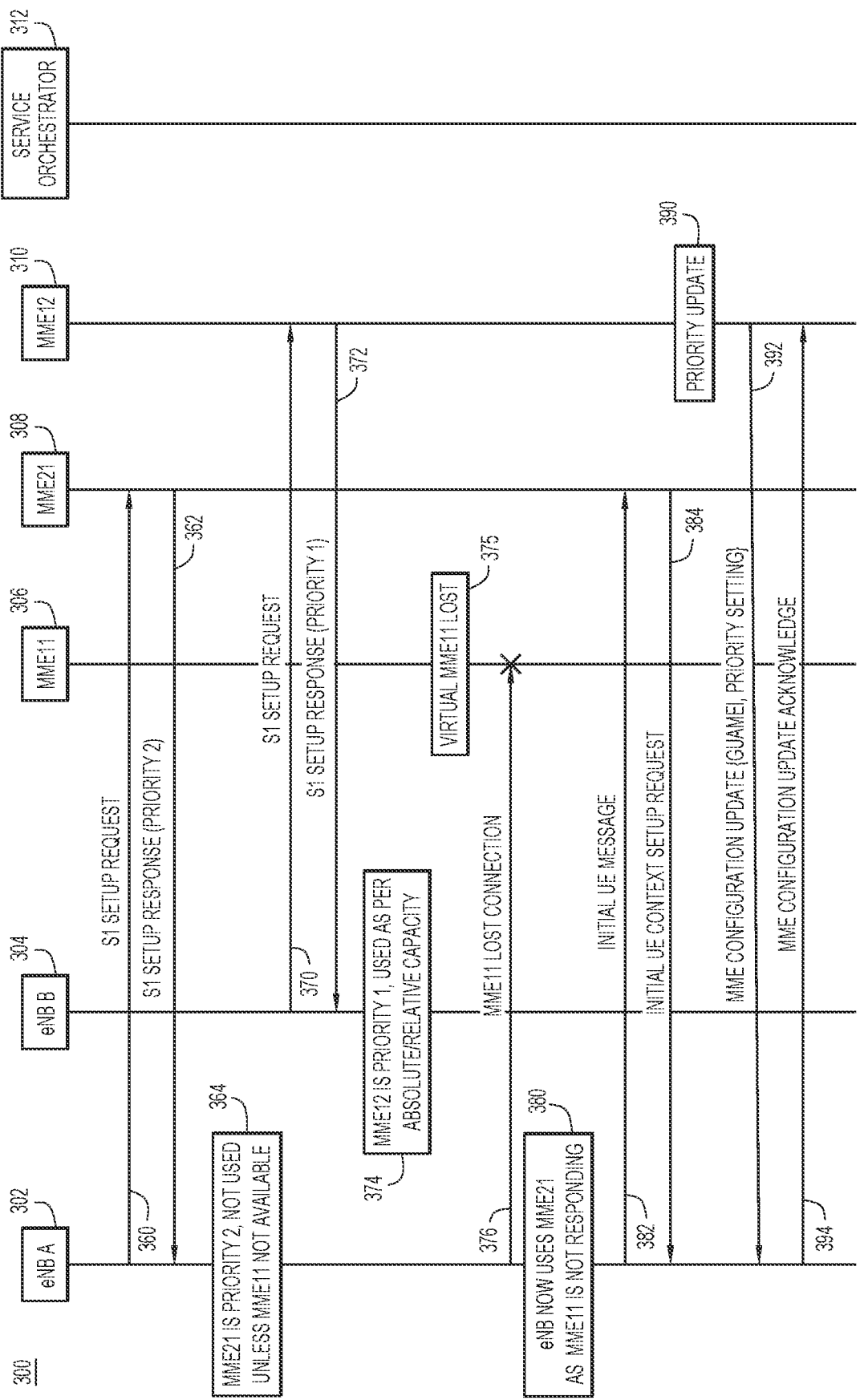

Reference is now made to FIGS. 3A and 3B for a description of a message sequence for the eNB setup and update process 300 according to an example embodiment. By way of example, the process 300 involves two eNBs, eNB_A at 302 and eNB_B at 304, an MME11 at 306 that is part of a first existing MME pool (pool X), two additional MMEs, MME21 at 308 that is to be added to a second existing pool (pool Y) and MME12 at 310 that is to be added to the first existing pool (pool X). The eNBs 302 and 304 are part of an eNB group called Group 1. For example purposes, there is another eNB group referred to as Group 2. In addition, the process involves a service orchestrator entity shown at 312 that communicates with the MMEs, and a radio network management entity 314 that is in communication with the service orchestrator entity 312. The radio network management entity 314 has or obtains knowledge about the eNBs (locations, etc.) and pools of MMEs (number of MMEs, location of MMEs, capacity, etc.) and generates the priority information for MMEs based on that knowledge. The radio network management entity 314 provides this priority information to the service orchestrator entity 312.

The eNB setup and update procedures as defined in 3GPP TS 36.413 are used in some of steps of this sequence. At 320, the S1-Setup procedure is performed between eNB 302 and MME 306. MME 306 responds with a Priority 1 for Group 1 eNBs and Priority 2 for Group 2 eNBs. At 322, the S1-Setup procedure is performed by eNB 304 and MME 306, and the MME 306 responds to eNB 304 with the same information as it provided to eNB 302. Depending on the eNB that the MME 306 responded to as part of the S1-Setup procedure, the MME 306 returns Priority 1 or Priority 2. The Priority is an addition to the tables in clauses 9.1.8.5 S1 SETUP RESPONSE and 9.1.8.10 MME CONFIGURATION UPDATE of 3GPP TS 36.413, as described above.

At 330, MME 308 is instantiated with service orchestrator entity 312 in pool Y. At 332, the service orchestrator entity 312 provides priority information to the MME 308. This priority information may provide, for example, that MME 308 has Priority 2 for Group 1 eNBs and Priority 1 for Group 2 eNBs. At 334, MME 308 sends a message to the service orchestrator entity 312 indicating that it is now in service.

At 340, MME 310 is instantiated with service orchestrator entity 312 in pool X. At 342, the service orchestrator entity 312 provides priority information to the MME 310. This priority information may provide, for example, that MME 310 has Priority 1 for Group 1 eNBs and Priority 2 for Group 2 eNBs. At 344, MME 310 sends a message to the service orchestrator entity 312 indicating that it is now in service.

When the service orchestrator entity 312 instantiates MME 308, the eNBs 302 and 304 are updated with this GUMEI and the eNB's setup S1-AP. This is shown at 350 and 352 in FIG. 3A.

Reference is now made to FIG. 3B. At 360, eNB 302 sends an S1-Setup request to MME 308. At 362, MME 308 sends an S1-Setup response that includes Priority 2 for eNB 302. As shown at 364, MME 308 is Priority 2 for eNB 302 so MME 308 is not used for eNB 302 unless MME 306 is not available. Once the eNB has an S1-Setup response with Priority 2 for an MME, it knows not to use that MME regardless of the Relative Capacity unless availability of a Priority 1 MME goes below a certain threshold.

At 370, eNB 304 sends an S1-Setup request to MME 310, and at 372 MME 310 responds with an S1-Setup response with Priority 1. As indicated at 374, eNB 304 will use MME 310 as per its Absolute/Relative Capacity because MME 310 has Priority 1 for eNB 304.

In the example flow below, MME 306 is not responding (as shown at 375) and eNB 302 switches to MME 308 for the UE initial setup. Specifically, as shown at 376, eNB 302 loses the connection to MME 306. As indicated at 380, eNB 302 switches over to use MME 308 since it has lost its connection to MME 306. At 382, eNB sends an initial UE message to MME 308. MME responds with the Initial UE Context Setup request to eNB 302, at 384. The UE's that were being managed by MME 306 re-attach to MME 308 and all other MME's with Priority 2. This is standard S1-Flex behavior.

If all the MMES with Priority 1 are not available, the eNB may start using an MME with Priority 2. Alternatively, if all the MMES with Priority 1 have reached capacity, then the eNB can select to use an MME with Priority 2. This could occur if some or all the Priority 1 MMES send an OVERLOAD START as defined in clause 8.7.6, "Overload Start" of 3GPP TS 36.413 and clause 4.3.7.4, "MME Control of Overload" of 3GPP TS 23.401.

An MME's Priority can be modified so that it may become available for use by a particular eNB. For example, at 390, the Priority of MME 390 is updated, so as to, for example, become a new backup MME for an eNB, such as eNB 302, due to the failure of MME 306. The Relative Capacity of an MME can be updated at any time. The MME may change its Relative Capacity due to auto-scaling events, etc. At 392, MME 310 sends a configuration update to eNB 302 to notify eNB 302 of its change in Priority. eNB 302 may respond with an MME configuration update acknowledgment message at 394.

Figure 4:
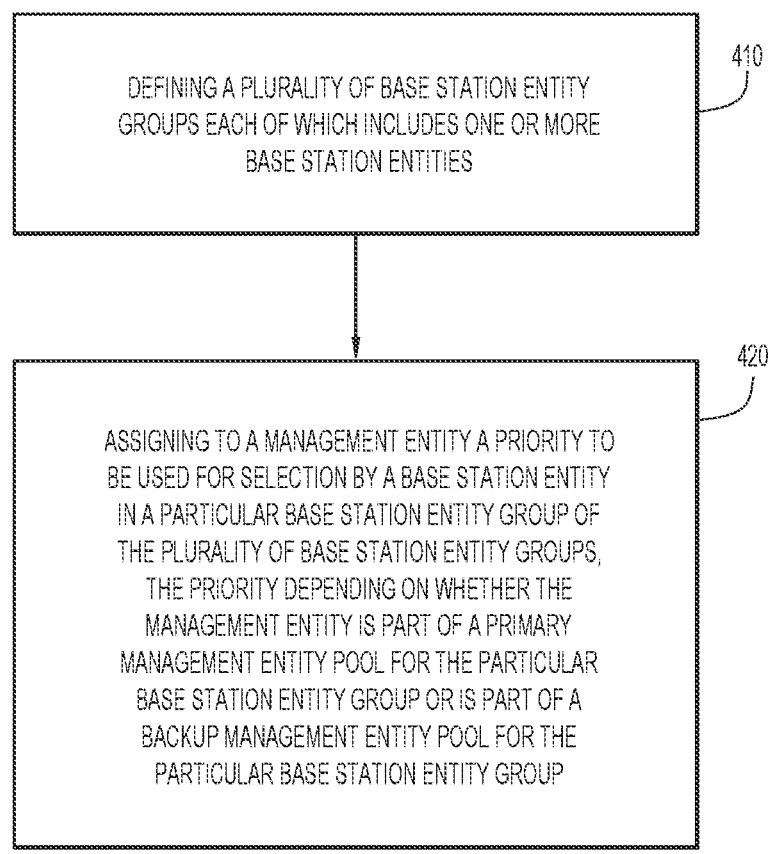
FIG. 4 is a flowchart depicting a process performed by a radio network management entity to generate priority information that is used for the automatic failover/switchover techniques presented herein, according to an example embodiment.

Reference is now made to FIG. 4, for a description of a flowchart of a process 400 performed by a radio network management entity, such as the radio network management entity 314 shown FIGS. 3A and 3B. The radio network management entity performs the process 400 for a mobile core network that includes a plurality of (datacenter) sites at which one or more management entities are provided to manage connections of user equipment served by a base station entity. At 410, the radio network management entity defines a plurality of base station entity groups, each of which includes one or more base station entities. At 420, the radio network management entity assigns to a management entity a priority to be used for selection by a base station entity in a particular base station entity group of the plurality of base station entity groups, the priority depending on whether the management entity is part of a primary management entity pool for the particular base station entity group or is part of a backup management entity pool for the particular base station entity group.

As described above, the primary management entity pool may be at a local site with respect to the particular base station entity group and the backup management entity pool may be at a remote site with respect to the particular base station entity group.

The assigning operation 420 may involve assigning priority to management entities such that management entities at the local site can have the same or different priority, per base station entity group.

As depicted in FIG. 2, there may be a plurality of backup management entity pools. In this case, the assigning operation 410 may involve assigning a different priority depending on which one of the plurality of backup management entity pools the management entity is a part.

As illustrated in FIG. 3B, the radio network management entity 314 provides to a service orchestrator entity 312 priority information that includes the priority assigned to the management entity, and the service orchestration entity 312 provides the priority to the management entity.

Figure 5:
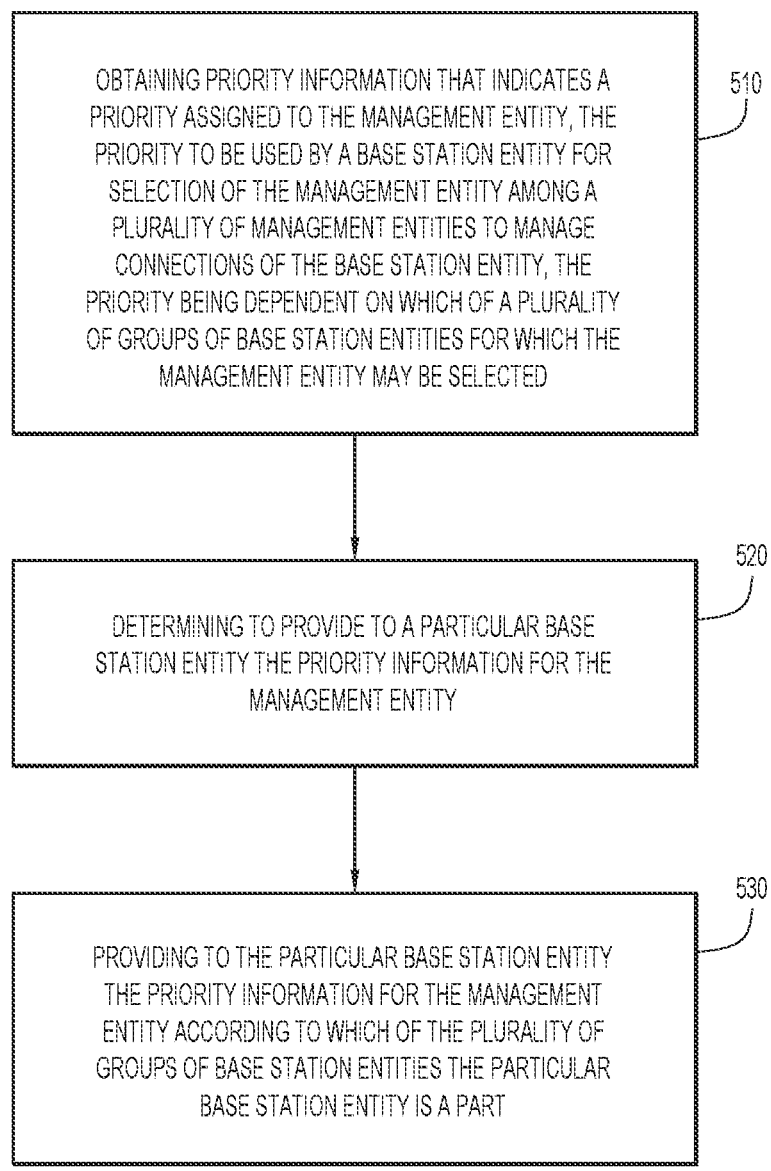
FIG. 5 is a flowchart depicting a process performed by management entity to advertise priority information used for the automatic failover/switchover techniques presented herein, according to an example embodiment.

Turning to FIG. 5, a flowchart is shown for a process 500 that a management entity performs in a mobile core network. At 510, the management entity obtains (e.g., from a service orchestration entity, direct configuration, default, etc.) priority information that indicates a priority assigned to the management entity. The priority is to be used by a base station entity for selection of the management entity among a plurality of management entities to manage connections of the base station entity, the priority being dependent on which of a plurality of groups of base station entities for which the management entity may be selected.

At 520, the management entity determines to provide to a particular base station entity the priority information for the management entity. At 530, the management entity provides to the particular base station entity the priority information for the management entity according to which of the plurality of groups of base station entities the particular base station entity is a part. The management entity may perform operation 520 by providing the priority in a message sent in response to a setup request message received from the particular base station entity or in an update message sent to the particular base station entity. Moreover, the management entity may also provide, in operation 530, relative capacity information that indicates available capacity of the management entity to handle connections and for use in selecting for use between two or more management entities that have the same priority.

As described above, a higher priority (e.g., represented by a lower numerical value) in the priority information provided to the particular base station entity indicates to the particular base station entity that it is to select the management entity for primary usage over management entities that have a lower priority (e.g., represented by a higher numerical value). The particular base station entity is to select a lower priority management entity for backup usage.

In one form, as depicted in FIG. 2, the higher priority in the priority information indicates that the management entity is part of a primary management entity pool for the particular base station entity and the lower priority in the priority information indicates that the management entity is part of a backup management entity pool for the particular base station entity.

Also as shown in FIG. 2, there may be a plurality of backup management entity pools of which the management entity may be a part. In this case, the lower priority in the priority information depends on which one of the plurality of backup management entity pools the management entity is a part. Furthermore, the primary management entity pool may be at a local site with respect to the base station entity and the backup management entity pool may be at a remote site with respect to the base station entity.

Figure 6:
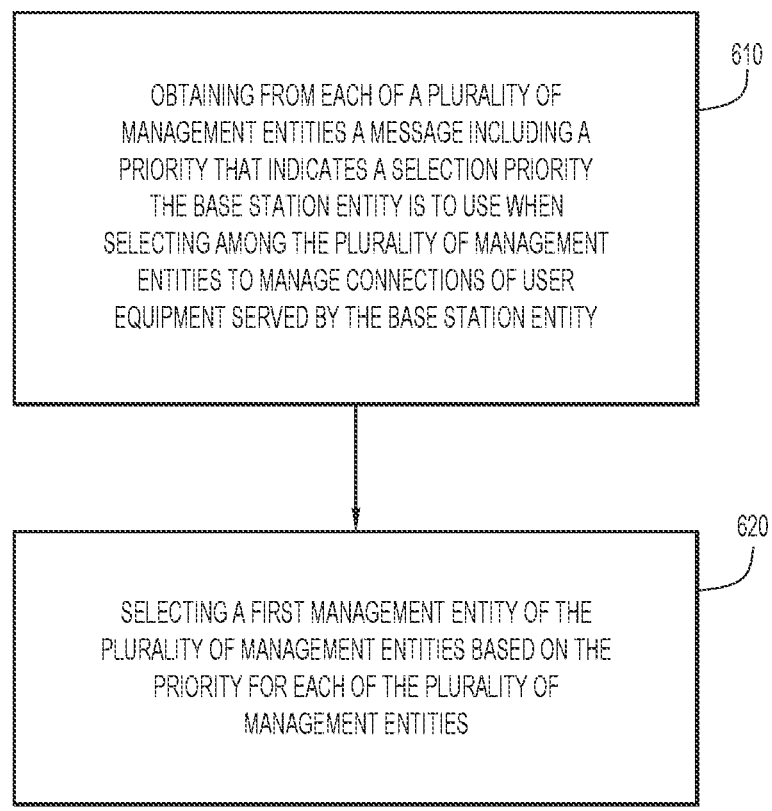
FIG. 6 is a flowchart depicting a process performed by a base station entity that obtains priority information to select among a plurality of management entities, according to an example embodiment.

Reference is now made to FIG. 6. FIG. 6 illustrates a flowchart for a process 600 performed by a base station entity in a mobile core network. At 610, the base station entity obtains from each of a plurality of management entities a message including a priority that indicates a selection priority the base station entity is to use when selecting among the plurality of management entities to manage connections of user equipment served by the base station entity. A higher priority indicates to the base station entity that it is to select a management entity among the plurality of management entities for primary usage over management entities that have a lower priority, which the base station entity is to select for backup usage.

At 620, the base station entity selects a first management entity of the plurality of management entities based on the priority for each of the plurality of management entities. As explained above, the base station entity may make the selection based further on relative capacity information included in the message, the relative capacity information indicating available workload capacity of the management entity.

The process 600 may further include determining that the first management entity cannot be used for new connections, such as due to failure, loss of connectivity or capacity overload of the first management entity. In this case, the base station entity switches to a second management entity for managing connections of the base station entity, wherein the second management entity has a lower priority than that of the first management entity.

Further still, the process 600 may include determining that the first management entity has restored or that a third management entity is available that has a higher priority. In this case, the base station entity will continue to use the second management entity for managing existing connections, and will select among the first management entity and the third management entity to use for new connections of the base station entity. Selecting among the first management entity and the third management entity may be based on a difference between a numeric value representing the priority of the first management entity and a numeric value representing a priority of the third management entity.

As illustrated in FIG. 2, the obtaining operation 610 may include: obtaining from a first pool of management entities the message that includes the relative capacity information and priority for each management entity in the first pool of management entities, wherein the priority associated with each management entity in the first pool of management entities is higher indicating that the first pool of management entities is to be for primary usage; and obtaining from a second pool of management entities the message that includes the relative capacity information and priority for each management entity in the second pool of management entities, wherein the priority associated with each management entity in the second pool of management entities is lower indicating that the second pool of management entities is to be for backup usage. In this case, the selecting operation 620 may involve selecting the first management entity from the first pool of management entities based on relative capacity information among the management entities in the first pool of management entities.

Furthermore, the process 600 may further include determining that all or at least a predetermined number of the management entities in the first pool of management entities have reached their peak capacity. In this case, the base station entity switches to the second pool of management entities to select a management entity among the plurality of management entities in the second pool of management entities based on relative capacities of the management entities in the second pool of management entities. Switching to the second pool of management entities includes automatically distributing connections of the base station entity to the second pool of management entities based on relative capacities of management entities in the second pool of management entities.

In still another form, as depicted in FIG. 2, the method may include obtaining from a third pool of management entities the message including the relative capacity information and priority for each management entity in the third pool of management entities. The priority associated with each management entity in the third pool of management entities is lower than the priority for each management entity in the second pool of management entities to indicate that the third pool of management entities is to be for backup usage.

In yet another form, the process 600 further includes obtaining from a third pool of management entities the message that includes the relative capacity information and priority for each management entity in the third pool of management entities. The priority associated with each management entity in the third pool of management entities is the same as the priority for each management entity in the first pool of management entities. In this case, the selecting operation 620 involves selects the first management entity from the first pool of management entities and the third pool of management entities based on relative capacity information among the management entities in the first pool of management entities and in the third pool of management entities.

Figure 7:
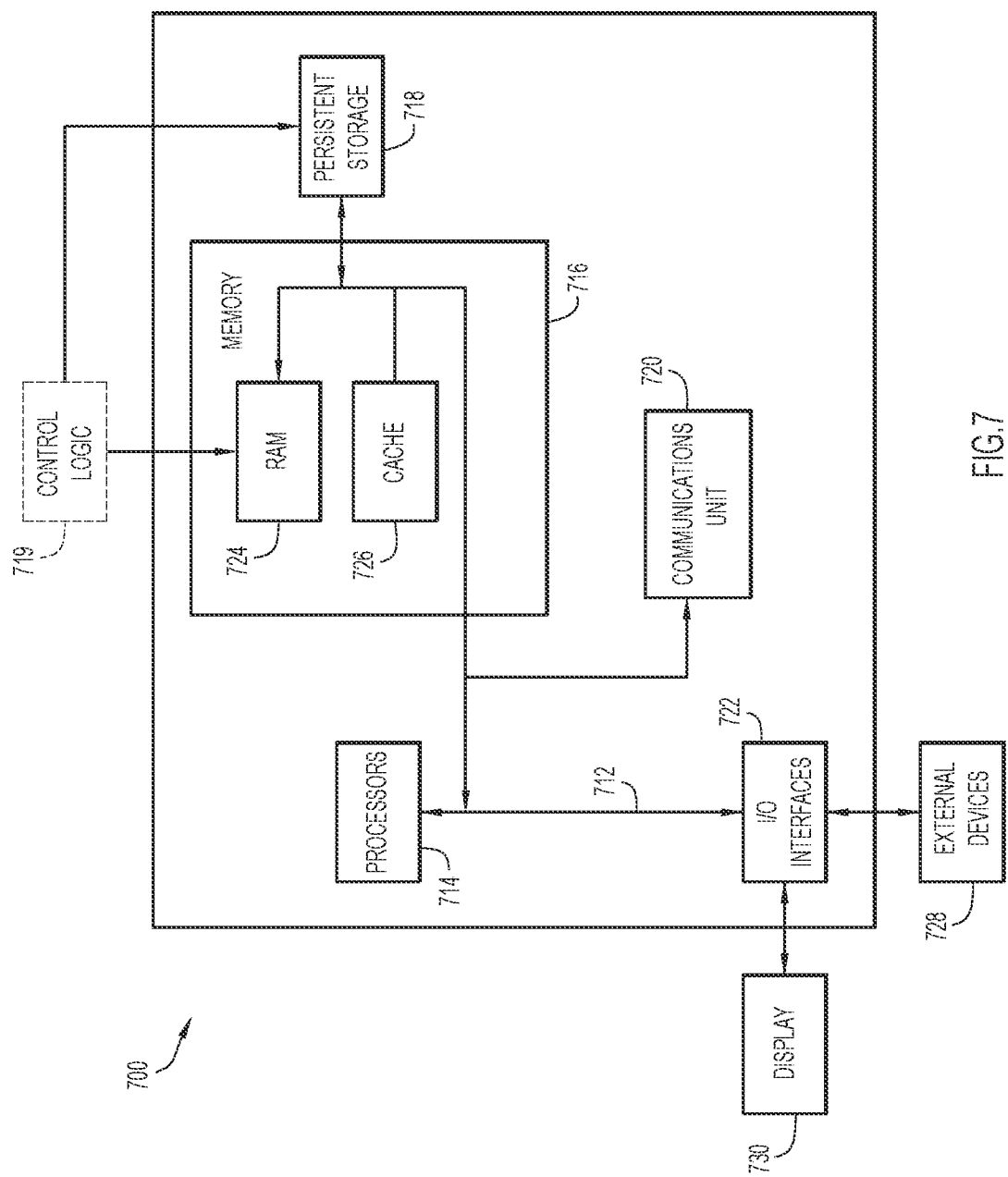
FIG. 7 is a block diagram of a computing device that may be configured to perform the operations of a radio network management entity and management entity as part of the techniques presented herein, according to an example embodiment.

FIG. 7 illustrates a hardware block diagram of a computing apparatus 700 that may perform the functions of any of the servers or computing or control entities referred to herein. It should be appreciated that FIG. 7 provides only an illustration of one embodiment and does not imply any limitations with regard to the environments in which different embodiments may be implemented. Many modifications to the depicted environment may be made.

As depicted, the apparatus 700 includes a bus 712, which provides communications between processor(s) 714, memory 716, persistent storage 718, communications unit 720, and input/output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes random access memory (RAM) 724 and cache memory 726. In general, memory 716 can include any suitable volatile or non-volatile computer readable storage media. Instructions for the control logic 719 may be stored in memory 716 or persistent storage 718 for execution by processor(s) 714. In the case where the computing apparatus 700 is performing management entity functions, the control logic 719 may be priority notification logic that, when executed by the processor(s) 714, cause computing apparatus 700 to perform the management entity operations depicted in FIG. 5 and elsewhere and described herein. In the case where the computing apparatus 700 is performing radio network management entity operations, the control logic 719 may be priority configuration generation logic that, when executed by the processor(s) 714, cause computing apparatus 700 to perform the radio network management entity operations depicted in FIG. 4 and elsewhere and described herein.

One or more programs may be stored in persistent storage 718 for execution by one or more of the processor(s) 714 via one or more memories of memory 716. The persistent storage 718 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to computing apparatus 700. For example, I/O interface 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
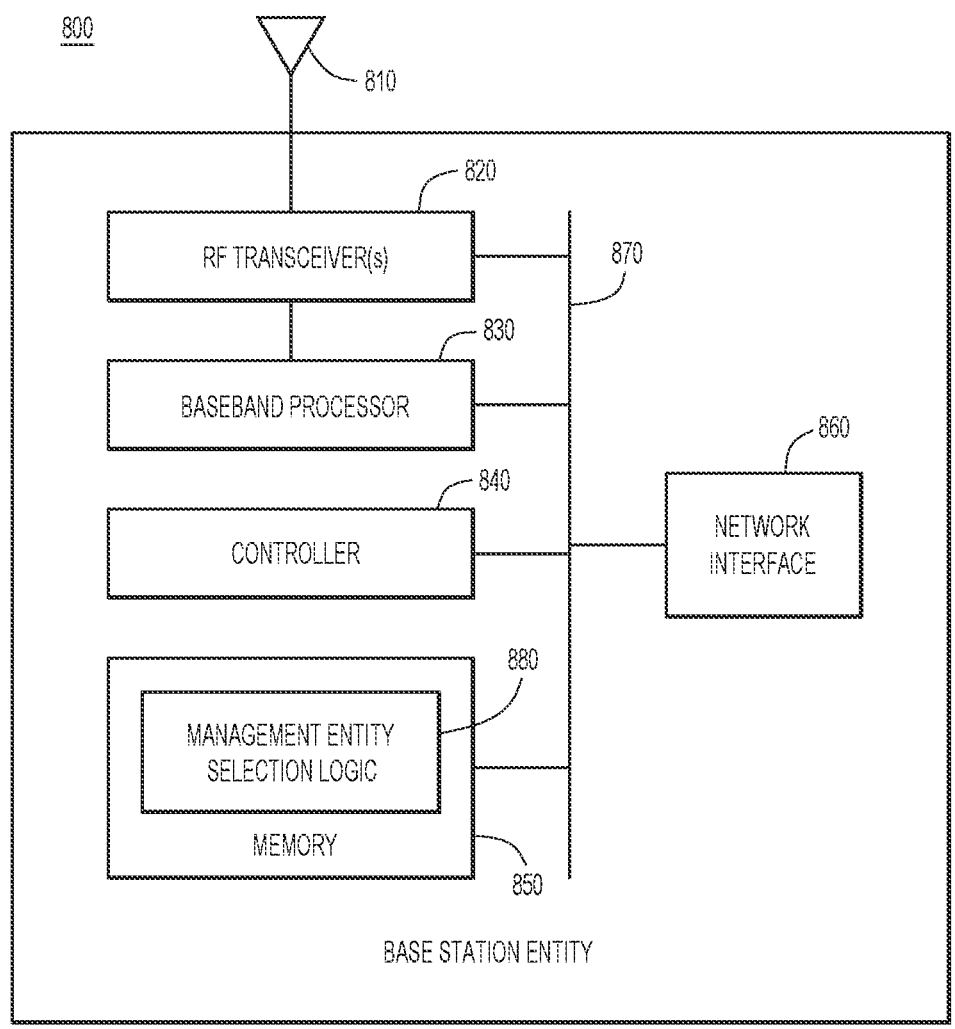
FIG. 8 is a block diagram of a base station entity configured to perform operations as part of the automatic failover/switchover techniques, according to an example embodiment.

Turning to FIG. 8, a block diagram is shown of a base station entity 800 configured to perform the operations described herein as part of the zero-touch failover/switchover techniques presented herein. The base station entity 800 includes one or more antennas 810, one or more radio frequency (RF) transceiver(s) 820, a baseband processor (modem) 830, a controller 840, memory 850, a wired network interface 860 and a bus 870. The RF transceiver(s) 820, baseband processor 830, controller 840, memory 850 and network interface 860 may be connected to the bus 870.

The RF transceiver(s) 820 are configured to wireless transmit, via antenna 810, signals to be received by UEs and to receive, via antenna 810, transmissions from UEs. The baseband processor 830 performs baseband signal processing (baseband modulation and baseband demodulation) as well as other signal processing and packet formatting, transmission scheduling, etc. The network interface 860 may be embodied by one or more network interface cards that enable network communication. This allows the base station entity 800 to communicate with other entities in a mobile core network, such as management entities, for example.

The controller 840 may be embodied by one or more microprocessors or microcontrollers. The controller 840 executes instructions stored in memory 850 to perform various control functions for the base station entity 800. In one form, the memory 850 stores instructions for management entity selection logic 880. The controller 840, when executing the instructions for management entity selection logic 880, is caused to control the operations of the base station entity 800 to perform the operations as part of the zero-touch failover/switchover techniques described herein.

Alternatively, the baseband processor 830 may be embodied by one or more application specific integrated circuits that are configured (in firmware, for example) to perform the operations of the management entity selection logic 880.

In summary, techniques are presented herein in which a new information element signaling priority of a management entity is included in a setup (e.g., S1-Setup) response or in configuration update messages sent by a management entity to a base station entity. The base station entity interprets this priority information along with the existing relative capacity information in an appropriate way to load-distribute the traffic/calls to highly preferable management entity instances (at a local site) when they are available and switchover/failover to lower preference management entity instances (at a local site) when there is a local site outage/failure or insufficient capacity in a geo-resilient pooled network.

In one form, a method is provided that is performed by a management entity in a mobile core network, the method comprising: obtaining priority information that indicates a priority assigned to the management entity, the priority to be used by a base station entity for selection of the management entity among a plurality of management entities to manage connections of the base station entity, the priority being dependent on which of a plurality of groups of base station entities for which the management entity may be selected; determining to provide to a particular base station entity the priority information for the management entity; and providing to the particular base station entity the priority information for the management entity according to which of the plurality of groups of base station entities the particular base station entity is a part.

Similarly, a management entity apparatus is provided comprising a network interface that enables network communications, and a processor, wherein the processor is configured to: obtain priority information that indicates a priority assigned to the management entity, the priority to be used by a base station entity for selection of the management entity among a plurality of management entities to manage connections of the base station entity, the priority being dependent on which of a plurality of groups of base station entities for which the management entity may be selected; determine to provide to a particular base station entity the priority information for the management entity; and provide to the particular base station entity the priority information for the management entity according to which of the plurality of groups of base station entities the particular base station entity is a part.

Moreover, one or more non-transitory computer readable storage media is provided, encoded with instructions that, when executed by a processor of a management entity apparatus, cause the processor to perform operations including: obtaining priority information that indicates a priority assigned to the management entity, the priority to be used by a base station entity for selection of the management entity among a plurality of management entities to manage connections of the base station entity, the priority being dependent on which of a plurality of groups of base station entities for which the management entity may be selected; determining to provide to a particular base station entity the priority information for the management entity; and providing to the particular base station entity the priority information for the management entity according to which of the plurality of groups of base station entities the particular base station entity is a part.

In another form, a method is provided that is performed by a radio network management entity for a mobile core network that includes a plurality of sites at which one or more management entities are provided to manage connections of user equipment served by a base station entity, the method comprising: defining a plurality of base station entity groups each of which includes one or more base station entities; and assigning to a management entity of the one or more management entities, a priority to be used for selection by a base station entity in a particular base station entity group of the plurality of base station entity groups, the priority depending on whether the management entity is part of a primary management entity pool for the particular base station entity group or is part of a backup management entity pool for the particular base station entity group.

Similarly, a radio network management entity apparatus is provided for a mobile core network that includes a plurality of sites at which one or more management entities are provided to manage connections of user equipment served by a base station entity. The apparatus includes a network interface that enables network communications, and a processor coupled to the network interface. The processor is configured to: define a plurality of base station entity groups each of which includes one or more base station entities; and assign to a management entity of the one or more management entities, a priority to be used for selection by a base station entity in a particular base station entity group of the plurality of base station entity groups, the priority depending on whether the management entity is part of a primary management entity pool for the particular base station entity group or is part of a backup management entity pool for the particular base station entity group.

Moreover, one or more non-transitory computer readable storage media is provided, encoded with instructions that, when executed by a processor of a radio network management entity apparatus for a mobile core network that includes a plurality of sites at which one or more management entities are provided to manage connections of user equipment served by a base station entity, cause the processor to perform operations including: defining a plurality of base station entity groups each of which includes one or more base station entities; and assigning to a management entity of the one or more management entities, a priority to be used for selection by a base station entity in a particular base station entity group of the plurality of base station entity groups, the priority depending on whether the management entity is part of a primary management entity pool for the particular base station entity group or is part of a backup management entity pool for the particular base station entity group.

In still another form, a method is provided that is performed by a base station entity in a mobile core network, the method comprising: obtaining from each of a plurality of management entities a message including a priority that indicates a selection priority the base station entity is to use when selecting among the plurality of management entities to manage connections of user equipment served by the base station entity, wherein a higher priority indicates to the base station entity that it is to select a management entity among the plurality of management entities for primary usage over management entities that have a lower priority, which the base station entity is to select for backup usage; and selecting a first management entity of the plurality of management entities based on the priority for each of the plurality of management entities.

Similarly, a base station apparatus is provided that includes a network interface to enable network communications, and a processor coupled to the network interface, wherein the processor is configured to: obtain from each of a plurality of management entities a message including a priority that indicates a selection priority the base station apparatus is to use when selecting among the plurality of management entities to manage connections of user equipment served by the base station entity, wherein a higher priority indicates to the base station apparatus that it is to select a management entity among the plurality of management entities for primary usage over management entities that have a lower priority, which the base station apparatus is to select for backup usage; and select a first management entity of the plurality of management entities based on the priority for each of the plurality of management entities.

Moreover, one or more non-transitory computer readable storage media is provided, encoded with instructions that, when executed by a processor of a base station, cause the processor to perform operations including: obtaining from each of a plurality of management entities a message including a priority that indicates a selection priority the base station is to use when selecting among the plurality of management entities to manage connections of user equipment served by the base station, wherein a higher priority indicates to the base station entity that it is to select a management entity among the plurality of management entities for primary usage over management entities that have a lower priority, which the base station is to select for backup usage; and selecting a first management entity of the plurality of management entities based on the priority for each of the plurality of management entities.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a management node in a mobile core network, the method comprising:
    obtaining, by the management node from a service orchestrator node, priority information that indicates a first priority for a first group of a plurality of groups of base station nodes and a second priority for a second group of the plurality of groups of base station nodes, assigned to the management node, wherein the priority information is to be used by a base station node for selection of the management node among a plurality of management nodes to manage connections of the base station node;
    determining to provide to a particular base station node the priority information for the management node; and
    providing to the particular base station node the priority information for the management node according to which of the plurality of groups of base station nodes the particular base station node is a part.

2. The method of claim 1, wherein a higher priority in the priority information provided to the particular base station node indicates to the particular base station node that it is to select the management node for primary usage over management nodes that have a lower priority, and the particular base station node is to select a lower priority management node for backup usage.

3. The method of claim 2, wherein the higher priority in the priority information indicates that the management node is part of a primary management node pool for the particular base station node and the lower priority in the priority information indicates that the management node is part of a backup management node pool for the particular base station node.

4. The method of claim 3, wherein there are a plurality of backup management nodes pools, and wherein the lower priority in the priority information depends on which one of the plurality of backup management node pools the management node is a part.

5. The method of claim 3, wherein the primary management node pool is at a local site with respect to the base station node and the backup management node pool is at a remote site with respect to the base station node.

6. The method of claim 1, wherein providing comprises providing the priority information in a message sent in response to a setup request message received from the particular base station node or in an update message sent to the particular base station node.

7. The method of claim 1, wherein providing includes providing relative capacity information that indicates available capacity of the management node to handle connections and for use in selecting for use between two or more management nodes that have a same priority.

8. A method performed by a radio network management node for a mobile core network that includes a plurality of sites at which one or more management nodes are provided to manage connections of user equipment served by a base station node the method comprising:
    obtaining, by the radio network management node, information about a plurality of base station nodes;
    assigning each of the plurality of base station nodes, by the radio network management node, into one of a plurality of base station node groups each of which includes one or more base station nodes of the plurality of base station nodes; and
    assigning, by the radio network management node, to a management node of the one or more management nodes, a priority to be used for selection by a base station node in a particular base station node group of the plurality of base station node groups, the priority depending on whether the management node is part of a primary management node pool for the particular base station node group or is part of a backup management node pool for the particular base station node group.

9. The method of claim 8, wherein the primary management node pool is at a local site with respect to the particular base station node group and the backup management node pool is at a remote site with respect to the particular base station node group.

10. The method of claim 9, wherein assigning comprises assigning priorities to management nodes such that management nodes at the local site can have a same or different priority, per base station node group.

11. The method of claim 8, wherein there are a plurality of backup management node pools, and wherein assigning includes assigning a different priority depending on which one of the plurality of backup management node pools the management node is a part.

12. The method of claim 8, further comprising providing to a service orchestration node, priority configuration information that includes the priority assigned to the management node, wherein the service orchestration node provides the priority to the management node.

13. The method of claim 8, assigning the priority includes:
    assigning, by the radio network management node to the management node, the priority such that the priority is different from another priority of another management node at same local site, based on being assigned to a different base station node group.

14. A method performed by a base station node in a wireless network, the method comprising:
    obtaining from each of a plurality of management nodes a message including a priority that indicates a selection priority the base station node is to use when selecting among the plurality of management nodes to manage connections of user equipment served by the base station node and relative capacity information that indicates available workload capacity of a respective management node from among the plurality of management nodes, wherein a higher priority indicates to the base station node that it is to select a management node among the plurality of management nodes for primary usage over management nodes that have a lower priority, which the base station node is to select for backup usage, and wherein the priority includes a first priority for a first group of a plurality of groups of base station nodes and a second priority for a second group of the plurality of groups of base station nodes; and selecting a first management node of the plurality of management nodes based on the priority for each of the plurality of management nodes and the relative capacity information.

15. The method of claim 14, further comprising:

determining that the first management node cannot be used for new connections; and switching to a second management node for managing connections of the base station node entity, wherein the second management node has a lower priority than that of the first management node.

16. The method of claim 15, further comprising:

determining that the first management node has restored or that a third management node is available that has a higher priority;

continuing to use the second management node for managing existing connections; and selecting among the first management node and the third management node to use for new connections of the base station node.

17. The method of claim 16, wherein selecting among the first management node and the third management node is based on a difference between a numeric value representing the priority of the first management node and a numeric value representing a priority of the third management node.

18. The method of claim 14, wherein obtaining includes:

obtaining from a first pool of management nodes the message that includes the relative capacity information and priority for each management node in the first pool of management nodes, wherein the priority associated with each management node in the first pool of management nodes is higher indicating that the first pool of management nodes is to be for primary usage;

obtaining from a second pool of management nodes the message that includes the relative capacity information and priority for each management node in the second pool of management nodes, wherein the priority associated with each management node in the second pool of management nodes is lower indicating that the second pool of management nodes is to be for backup usage; and wherein selecting comprises selecting the first management node from the first pool of management nodes based on relative capacity information among the management nodes in the first pool of management nodes.

19. The method of claim 18, further comprising:

determining that all or at least a predetermined number of the management nodes in the first pool of management nodes have reached their peak capacity; and switching to the second pool of management nodes to select a management node among the plurality of management nodes in the second pool of management nodes based on relative capacities of the management nodes in the second pool of management nodes.

20. The method of claim 19, wherein switching to the second pool of management nodes includes automatically distributing connections of the base station node to the second pool of management nodes based on relative capacities of management nodes in the second pool of management nodes.

21. The method of claim 18, wherein obtaining further comprises:

obtaining from a third pool of management nodes the message including the relative capacity information and priority for each management node in the third pool of management nodes, wherein the priority associated with each management node in the third pool of management nodes is lower than the priority for each management node in the second pool of management nodes to indicate that the third pool of management nodes is to be for backup usage.

\* \* \* \* \*

UNITED STATES PATENT AND TRADEMARK OFFICE
CERTIFICATE OF CORRECTION

PATENT NO. : 11,258,656 B2
APPLICATION NO. : 16/278787
DATED : February 22, 2022
INVENTOR(S) : Raghavendra Suryanarayanarao et al.

It is certified that error appears in the above-identified patent and that said Letters Patent is hereby corrected as shown below:

In the Claims

Claim 15, Column 23, Line 23, please replace "base station node entity" with --base station node--

Signed and Sealed this
Twenty-fifth Day of October, 2022

*Katherine Kelly Vidal*

Katherine Kelly Vidal
*Director of the United States Patent and Trademark Office*